(12) United States Patent
Egami et al.

(10) Patent No.: US 7,785,013 B2
(45) Date of Patent: Aug. 31, 2010

(54) HIGH-ACCURACY SLIDING BEARING

(75) Inventors: Masaki Egami, Kuwana (JP); Seiji Shimizu, Aichi (JP); Takeshi Tanimaru, Nabari (JP)

(73) Assignees: NTN Corporation, Osaka (JP); Nakanishi Metal Works Co. Ltd., Osaka (JP)

( * ) Notice: Subject to any disclaimer, the term of this patent is extended or adjusted under 35 U.S.C. 154(b) by 562 days.

(21) Appl. No.: 11/596,530

(22) PCT Filed: May 24, 2005

(86) PCT No.: PCT/JP2005/009411

§ 371 (c)(1),
(2), (4) Date: Nov. 13, 2006

(87) PCT Pub. No.: WO2005/116468

PCT Pub. Date: Dec. 8, 2005

(65) Prior Publication Data

US 2007/0177833 A1 Aug. 2, 2007

(30) Foreign Application Priority Data

May 27, 2004 (JP) .............................. 2004-157156

(51) Int. Cl.
*F16C 33/24* (2006.01)
(52) U.S. Cl. .................................................... 384/283
(58) Field of Classification Search ................. 384/129, 384/275, 276, 279, 282, 286, 291, 297, 299, 384/300, DIG. 902, 907–909; 264/267, 269, 264/328.8, 328.9, 328.12
See application file for complete search history.

(56) References Cited

U.S. PATENT DOCUMENTS

| 1,236,511 | A | * | 8/1917 | Waring ........................ 384/291 |
| 3,023,059 | A | * | 2/1962 | Kirk .............................. 384/97 |
| 4,748,862 | A | * | 6/1988 | Johnston ........................ 74/7 R |
| 5,762,423 | A | * | 6/1998 | Mori et al. ................... 384/279 |

(Continued)

FOREIGN PATENT DOCUMENTS

JP 55-68169 A 5/1980

(Continued)

OTHER PUBLICATIONS

International Search Report, Aug. 12, 2005.

*Primary Examiner*—Thomas R Hannon
*Assistant Examiner*—Phillip Johnson
(74) *Attorney, Agent, or Firm*—Hedman & Costian, P.C.; James V. Costigan

(57) ABSTRACT

The present invention provides a high-accuracy sliding bearing which eliminates the need for treating a gate mark, has a high accuracy, is excellent in its mechanical strength, and is in its productivity. A sintered metal (2) is used as a bearing peripheral part. A resin material is molded at a sliding portion of the bearing peripheral part to form a resin layer (3). In the resin layer (3), a product of a coefficient of linear thermal expansion of the resin material and a thickness of the resin layer is not more than 0.15. The resin layer (3) is molded through tunnel gates. The resin layer comprises a plurality of axial grooves (4A) and (4B) on a bearing sliding surface thereof, and the tunnel gate marks (5) are alternately formed on a bottom of each of the grooves.

5 Claims, 4 Drawing Sheets

U.S. PATENT DOCUMENTS

| | | | |
|---|---|---|---|
| 6,000,295 A * | 12/1999 | Kimizuka | 74/434 |
| 6,086,257 A * | 7/2000 | Lee | 384/279 |
| 6,494,621 B2 * | 12/2002 | Markovitch | 384/292 |
| 6,655,842 B2 * | 12/2003 | Kanayama et al. | 384/276 |
| 7,138,081 B2 * | 11/2006 | Inoue et al. | 264/254 |
| 2003/0219180 A1 * | 11/2003 | Huang | 384/279 |

FOREIGN PATENT DOCUMENTS

| | | | |
|---|---|---|---|
| JP | 02-245515 A | | 10/1990 |
| JP | 7-276428 A | | 10/1995 |
| JP | 2000-143228 | | 5/2000 |
| JP | 2000-266047 A | | 9/2000 |
| JP | 2002019377 A | * | 1/2002 |
| JP | 2003-239976 A | | 8/2003 |
| JP | 2003239976 A | * | 8/2003 |

* cited by examiner (a)

(b)

(a)

(b)

HIGH-ACCURACY SLIDING BEARING

TECHNICAL FIELD

The present invention relates to a high-accuracy sliding bearing.

BACKGROUND ART

Conventionally, as a sliding bearing having a high rotational accuracy, a sliding bearing composed of a porous sintered metal impregnated with oil is known. When this sliding bearing is used by impregnating a porous material consisting of the sintered metal with the oil, it is possible to successively supplying a sliding interface with the oil. Thus it is possible to reduce a frictional force. Because a mating material of the sliding bearing is generally made of the same metal material as that of the sliding bearing, there is no fear of wrap of the sliding bearing around the mating material and separation of the sliding bearing therefrom owing to the difference between the linear expansion degree of the mating material and that of the sliding bearing. Because the processing accuracy of this metal material can be enhanced, the metal material is suitably used at a position where a high rotational accuracy is demanded.

Other than the above-described sliding bearing, a sliding bearing, having self-lubricating properties, which is composed of a resin to which a solid lubricant such as polytetrafluoroethylene, graphite, molybdenum disulfide or the like, a lubricating oil or wax is added is known.

But there is a fear that the sliding bearing composed of the porous sintered metal impregnated with the oil wears the mating material made of a soft material. Further when the supply of the lubricating oil is interrupted, there is a fear that metal contact occurs. On the other hand, when a resin material having an excellent sliding property is used for the sliding bearing, the resin material does not attack the mating material made of the soft material. But in this case, a problem that owing to contraction and expansion of the resin material, wrap of the sliding bearing around the shaft occurs. Further in this case, it is necessary to increase the gap between the bearing and the shaft. Thereby a problem that the rotational accuracy deteriorates occurs.

Therefore the following high-accuracy sliding bearing is disclosed (see patent document 1): A metal is used for a bearing peripheral part of the sliding bearing. A resin material is molded at a sliding portion of the bearing peripheral part to form a resin layer. Fine concavities are formed essentially at a portion, of the surface of the bearing peripheral part, which contacts the resin layer. In the resin layer, (the coefficient of linear thermal expansion of the resin material)×(the thickness of the resin layer) is set to not more than 0.15. The apparent area of the concavities is set to 25 to 95% of the area of the portion, of the surface of the bearing peripheral part, which contacts the resin layer (see patent document 1).

Because a dimensional change of the resin layer caused by a change of temperature is suppressed, the above-described high-accuracy sliding bearing has a high accuracy and an excellent lubricating performance. Further because the high-accuracy sliding bearing has the resin layer formed on the sliding portion thereof, the high-accuracy sliding bearing does not attack a mating material made of a soft material nor generates an abnormal noise. Furthermore the high-accuracy sliding bearing has another characteristic that the resin layer adheres strongly to the bearing peripheral part by an anchor effect because the resin layer penetrates into the fine concavities.

But as the accuracy of the high-accuracy sliding bearing becomes higher, a gate mark formed at a time of injection molding may adversely affect the performance of the bearing. In addition, there is an increase in the number of producing steps owing to treatment of the gate mark. Thus the high-accuracy sliding bearing may have an inferior productivity.

Patent document 1: Japanese Patent Application Laid-Open No. 2003-239976

DISCLOSURE OF THE INVENTION

Problem to be Solved by the Invention

The present invention has been made to cope with the above-described problem. It is an object of the present invention to provide a high-accuracy sliding bearing which has a high accuracy and is excellent in its mechanical strength and its productivity, even though a gate mark is treated.

Means for Solving the Problem

The present invention provides a high-accuracy sliding bearing comprises a bearing peripheral part having a sintered metal, a resin layer which is formed by molding of a resin material to a sliding portion of the bearing peripheral part, and the product of a coefficient of linear thermal expansion (unit: 1/° C.) of the resin material and a thickness (unit: μm) of the resin layer is not more than 0.15. The resin layer is formed by molded through tunnel gates. In the present invention, the coefficient of linear thermal expansion of the resin material indicates an average coefficient of linear thermal expansion at 25° C. to 75° C.

The resin layer of the high-accuracy sliding bearing has a plurality of grooves on a bearing sliding surface thereof and has gate marks of the tunnel gates on bottoms of the grooves.

The plurality of the grooves is formed on a radial sliding surface of a cylindrical bearing or a thrust sliding surface thereof.

The plurality of the grooves includes grooves A each having the gate mark and grooves B not having the gate mark. The grooves B are so disposed that a distance between each of the grooves B and one side of the adjacent groove A on the bearing sliding surface and the distance between each of the grooves B and the other side of the adjacent groove A are equal to each other.

The resin material is composed of polyethylene resin and a porous silica added thereto.

At least one of the resin layer and the sintered metal is impregnated with a lubricating oil.

EFFECT OF THE INVENTION

In the high-accuracy sliding bearing of the present invention, the resin layer is molded through the tunnel gates. Therefore it is unnecessary to treat the gate mark and thus the high-accuracy sliding bearing can be produced with a high productivity. Particularly each of the tunnel gates is disposed on the bottom of each of a plurality of the grooves formed on the bearing sliding surface. Particularly each of the tunnel gates is disposed on the bottom of each of a plurality of the grooves formed on the radial sliding surface of the cylindrical bearing or the thrust sliding surface thereof. Accordingly the gate mark does not remain on the sliding surface. Further abraded powder generated by sliding escapes to the grooves and does not remain on the sliding surface. Consequently the sliding bearing having a high accuracy is produced.

Further, the plurality of the grooves includes the grooves A each having the gate mark and the grooves B not having the gate mark. The grooves B are so disposed that the distance between each of the grooves B and one side of the adjacent groove A on the bearing sliding surface and the distance between each of the grooves B and the other side of the adjacent groove A are equal to each other. Therefore a weld-generation position is formed in the groove B. Thus a weld portion is not formed on the sliding surface. Thereby it is possible to produce the high-accuracy sliding bearing excellent in its mechanical strength.

EXPLANATION OF REFERENCE NUMERALS AND SYMBOLS

Figure 1:
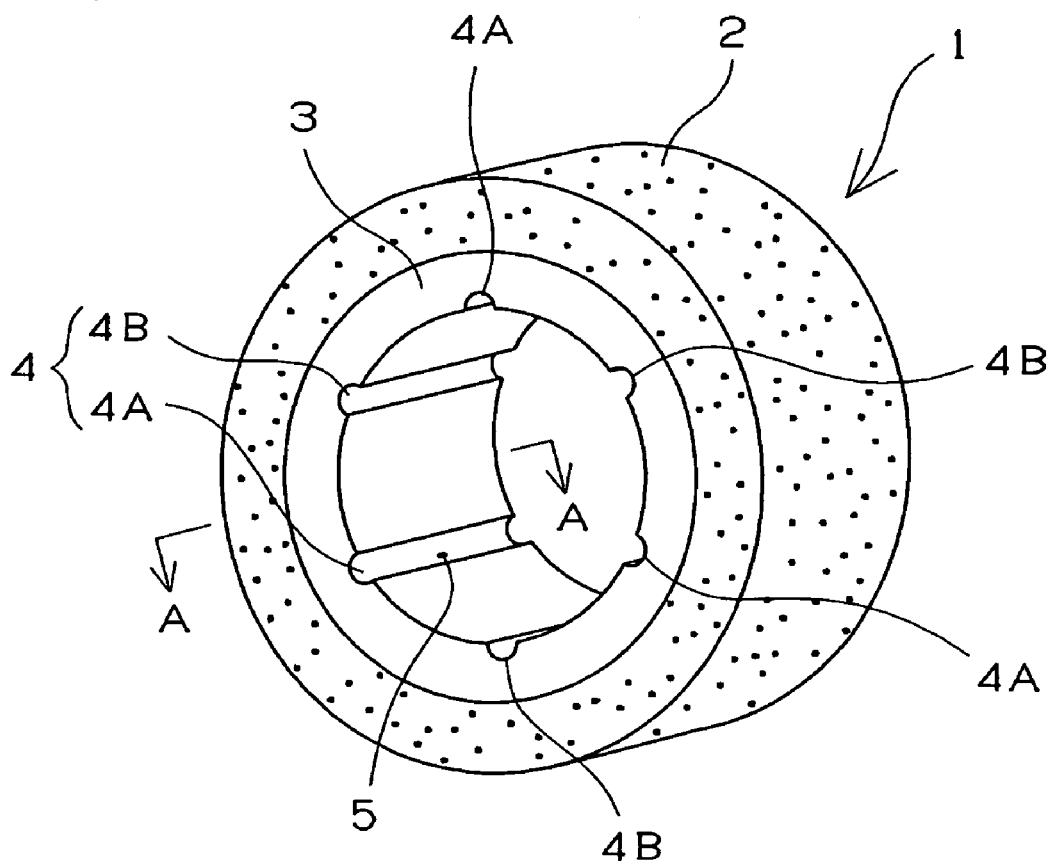
FIG. 1 shows a high-accuracy sliding bearing.
Figure 1:
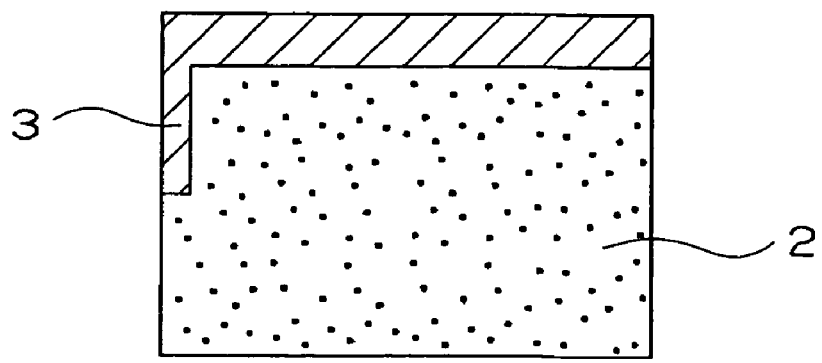

1: high-accuracy sliding bearing
2: bearing peripheral part
3: resin layer
4: groove
5: gate mark
6: stationary-side template
7: sprue
8: movable-side template
9: runner
10: cavity
11: projected pin
12: tunnel gate

BEST MODE FOR CARRYING OUT THE INVENTION

FIG. 1 shows a high-accuracy sliding bearing of the present invention. FIG. 1(a) is a perspective view, and FIG. 1(b) is an sectional view taken along a line A-A.

In a high-accuracy sliding bearing 1, a bearing peripheral part 2 is made of a sintered metal. A resin layer 3 is molded at a sliding portion of the bearing peripheral part 2 through tunnel gates. The resin layer 3 has a plurality of grooves 4 on a bearing sliding surface thereof. A gate mark 5 is formed on bottoms of the grooves 4. In FIG. 1(a), a plurality of the grooves 4 is formed on a radial sliding surface of the cylindrical bearing as axial grooves 4A, 4B. The gate mark 5 is formed on a bottom of each of the axial grooves 4A, but not formed on the axial grooves 4B.

It is possible to form a construction having the tunnel gate mark on all of a plurality of the axial grooves 4.

Figure 3:
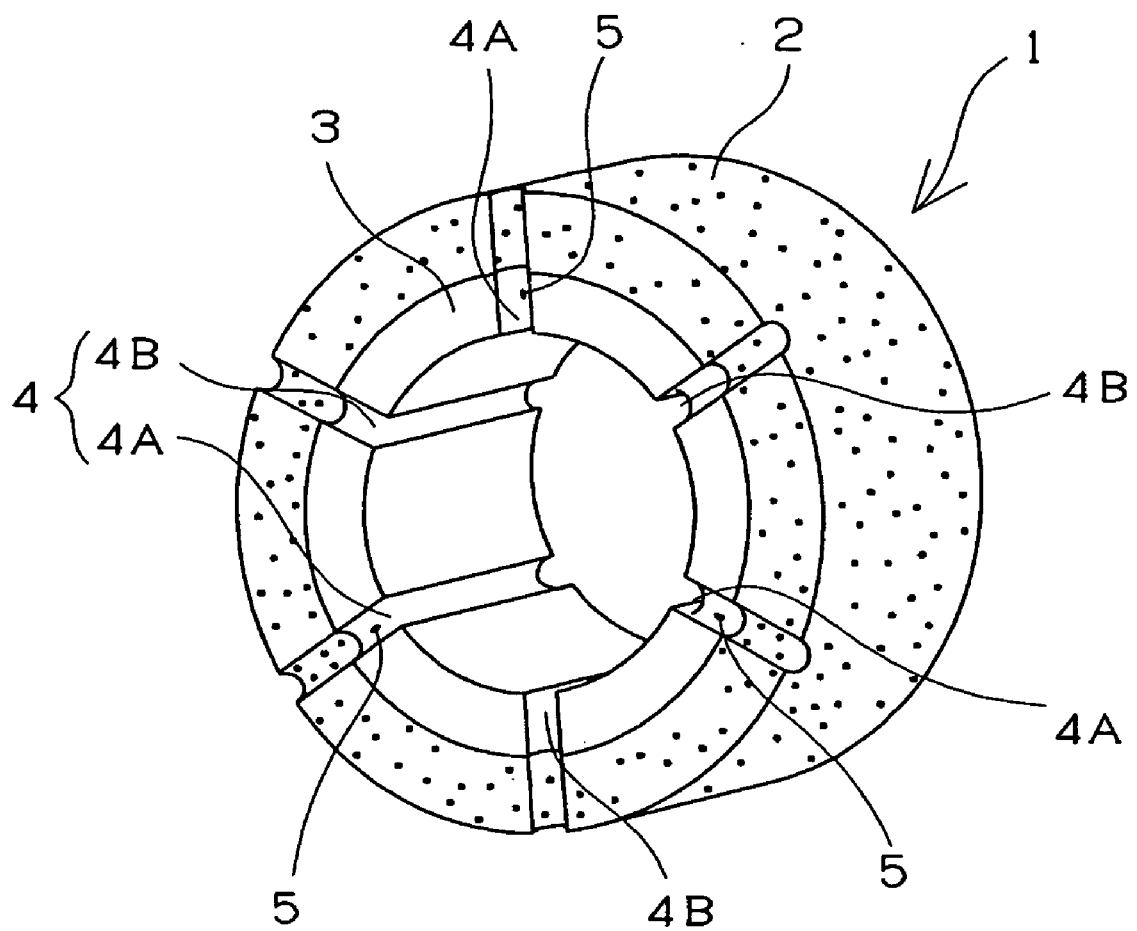
FIG. 3 is a perspective view of the high-accuracy sliding bearing having grooves on radial and thrust sliding surfaces.

A plurality of the grooves 4 can be formed on the radial sliding surface of the cylindrical bearing, the thrust sliding surface thereof or both the radial sliding surface and the thrust sliding surface. FIG. 3 shows an example in which the grooves 4 are formed on both the radial sliding surface and the thrust sliding surface. FIG. 3 shows a perspective view of the high-accuracy sliding bearing.

In FIG. 3, the axial grooves formed on the radial sliding surface are formed on the thrust sliding surface as the radial grooves 4A, 4B, with the radial grooves 4A and 4B communicating with each other. The gate mark 5 is formed on a bottom of each of the radial grooves 4A formed on the thrust sliding surface but not formed on the radial grooves 4B.

Figure 2:
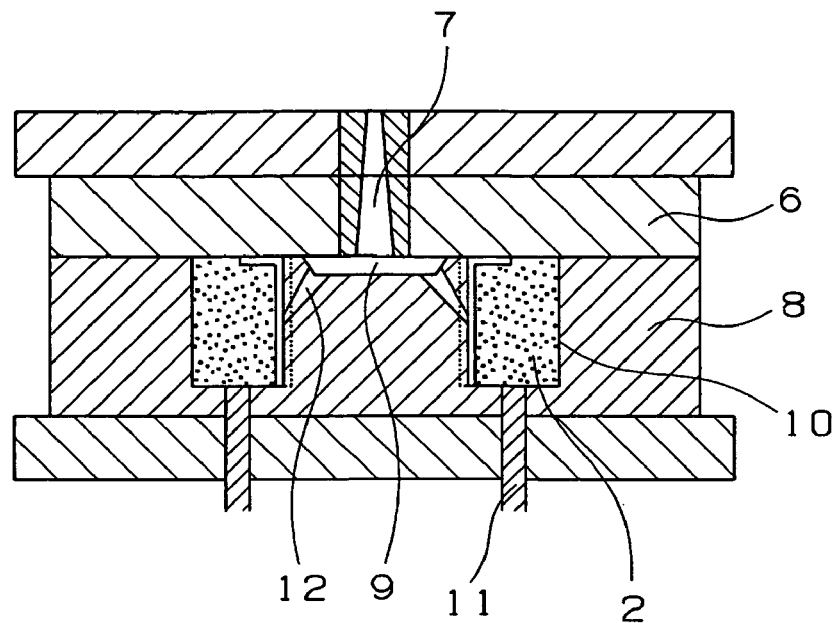
FIG. 2 shows molding.
Figure 2:
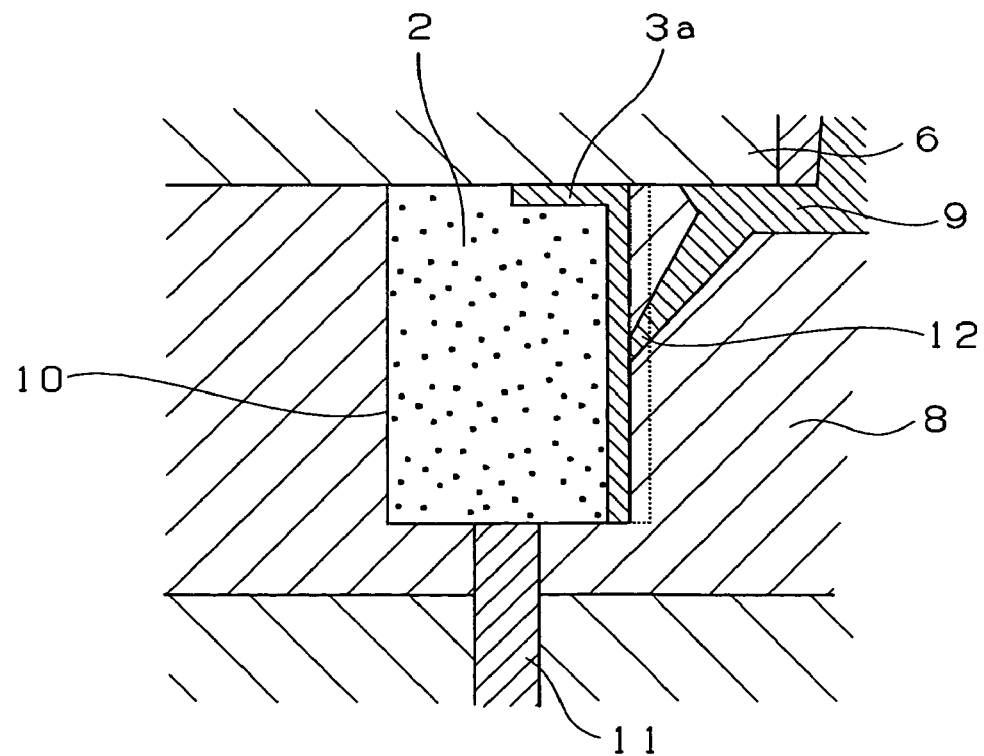

Resin molding for producing the high-accuracy sliding bearing of the present invention is described below with reference to FIG. 2. FIG. 2(a) shows a state in which a sintered metal is disposed inside a cavity of a die. FIG. 2(b) is a partly enlarged view showing a resin-filled state.

In FIG. 2(a), a reference numeral 6 denotes a stationary-side template. A sprue 7 for supplying a melted resin is formed at a central portion of the stationary-side template 6. A movable-side template 8 is butted against the stationary-side template 6. A runner 9 communicating with the sprue 7 is formed on the movable-side template 8. A cavity 10 is formed at a portion adjacent to the runner 9. A sintered metal 2 is inserted into the cavity 10. A portion of the cavity 10 forming the bottom of the groove of the inner peripheral surface, of the sliding bearing, constituting the radial sliding surface thereof is connected with the runner 9 through tunnel gates (submarine gate) 12, and a projected pin 11 is movably fitted in a bottom of the cavity 10. The stationary-side template 6, the movable-side template 8, and the projected pin 11 are closed (butted) and opened by an unshown hydraulic cylinder or the like.

A material of the high-accuracy sliding bearing is molded as follows by using this die. As shown in FIG. 2(a), after the sintered metal 2 is inserted into the cavity 10, the stationary-side template 6 and the movable-side template 8 are clamped by the unshown hydraulic cylinder or the like to butt parting surfaces thereof against each other. It is preferable that the sintered metal 2 is inserted into the cavity 10 after it is preheated. When a melted resin composition 3a is supplied from the sprue 7, the resin composition 3a is supplied to the cavity 10 through the runner 9 and the tunnel gate 12.

After the resin composition 3a solidifies, the movable-side template 8 is opened by the unshown hydraulic cylinder or the like. At this time, a molding is taken out of the die with the projected pin 11, and the gate mark 5 (FIG. 1(a)) is automatically separated from the molding. By carrying out this method, the high-accuracy sliding bearing 1 of the present invention is produced.

The high-accuracy sliding bearing 1 has a plurality of the axial grooves 4 formed on the surface of the resin layer constituting the inner peripheral surface of the bearing and has the gate mark 5 of each tunnel gate on the bottom of each of the grooves (FIG. 1(a)).

To improve the rotational accuracy of the shaft, the high-accuracy sliding bearing 1 allows the gap between it and the shaft to be decreased. At this time, when abraded powder is generated by sliding, the generated abraded powder may be present in the gap. In this case, the rotational torque is increased, and the abraded powder acts as an abrasive material, which may cause the shaft and the bearing to have abnormal abrasion. By forming a plurality of the axial grooves 4, the abraded powder is captured by the grooves 4 and thereby the generation of the abnormal abrasion can be suppressed. It is preferable to dispose the axial grooves 4 in parallel with the axis of the inner diameter of the bearing, because removal of the molding from the die can be facilitated.

It is preferable that an apparent area of one of a plurality of the axial grooves 4 is 0.5 to 10% of the area of the entire inner-diameter surface and that the sum of the apparent areas of the grooves 4 is 0.5 to 30% of the area of the entire inner-diameter surface. If the sum of the apparent areas of the grooves 4 is less than 0.5%, each of the axial grooves does not have a sufficient volume. Thus there is a possibility that a long-term operation is inhibited. On the other hand, if the sum of the apparent areas of the grooves 4 is more than 30%, an area of a portion to which a load is applied decreases and thus a face pressure becomes excessive, thereby causing the abnormal abrasion to occur.

A plurality of the axial grooves 4 includes the grooves 4A each having the tunnel gate mark and the grooves 4B not having the tunnel gate mark. The grooves 4B are so disposed that the distance between each of the grooves 4B and one side of the adjacent groove 4A on the bearing sliding surface and the distance between each of the grooves 4B and the other side of the adjacent groove 4A are equal to each other. It is preferable that the grooves 4A and 4B are arranged at equal intervals and that the number of the grooves 4A and the number of the grooves 4B are equal to each other. By arranging the grooves 4A and 4B in this way, a weld portion is formed in each of the grooves 4B at an injection molding time.

The bearing peripheral part 2 is composed of a cylindrical member, constituting the peripheral part of the sliding bearing, which has the sliding portion. The sliding portion includes a sliding portion disposed at the inner-diameter side, of the bearing peripheral part 2, for supporting a load applied in a radial direction. In the case where a load applied in a thrust direction is also supported, the sliding portion includes not only the above-described inner sliding portion, but also an end-surface sliding portion.

As the sintered metal constituting the bearing peripheral part 2, a Fe-based sintered metal, a Cu-based sintered metal, and a Fe—Cu-based sintered metal are listed. The bearing peripheral part 2 may contain C, Zn, Sn, and the like as a component thereof. To improve the moldability and the release property, a binder may be added to the sintered metal. It is possible to use an aluminum-based material containing Cu, Mg or Si and a metal-synthetic resin material in which iron powder is bonded with an epoxy synthetic resin. Further, to improve the adhesion of the iron powder to the resin layer, it is possible to perform surface treatment or use an adhesive agent to such an extent that a molding operation is not inhibited.

To obtain a sliding bearing excellent in its mechanical strength and durability as well as its dimensional accuracy and rotational accuracy, the Fe-based sintered metal is preferable. The "Fe-based" means that the content of Fe is not less than 90% in a weight ratio. So long as this condition is satisfied, the bearing peripheral part 2 may contain other components such as Cu, Sn, Zn or C. "Fe" includes stainless steel.

The Fe-based sintered metal can be formed by molding a metal powder material (to improve the moldability and release property thereof, a small amount of a binder may be added thereto) containing Fe at the above-described content into a predetermined configuration, degreasing it, and as necessary, post-treating, for example, sizing a sintered material produced by calcining it. Inside the sintered metal, a large number of internal pores are formed because the sintered metal has a porous tissue. A large number of surface openings are formed on the surface of the sintered metal, because the internal pores are open to the outside. The internal pores can be impregnated with oil by vacuum impregnation or the like.

At the sliding portion of the bearing peripheral part 2 made of the sintered metal, the resin layer 3 is molded through the tunnel gate to form a bearing surface which slide on a shaft member. At a molding time, because melted resin forming the resin layer penetrates into the above-described internal pores disposed in the surface region of the sintered metal from the above-described surface openings and solidifies, the resin layer adheres strongly to the surface of the parent body by an anchor effect. Therefore in spite of the sliding of the resin layer on the shaft member, the resin layer hardly separates or drops from the parent body and hence has a high durability.

It is preferable to set the surface open area ratio of the surface of the sintered metal on which the resin layer is formed to 20 to 50%. If the surface open area ratio is less than 20%, the anchor effect for the resin layer is obtained insufficiently. If the surface open area ratio is more than 50%, the dimensional accuracy and mechanical strength of the high-accuracy sliding bearing cannot be reliably maintained. The "surface open area ratio" means the ratio of the total area of the surface openings to a unit area of the surface of the sintered metal.

A resin material, forming the resin layer, which is excellent in the sliding performance when it is formed into the resin layer is preferable. It is possible to add a solid lubricant and a lubricating oil to the resin material. As the resin material, it is possible to use any synthetic resin that can be injection-molded and can be processed into a form which can be used as a sliding member. For example, it is possible to list polyethylene resins such as low-density polyethylene, high-density polyethylene, an ultra-high-molecular-weight polyethylene; modified polyethylene resin, water-cured polyolefin resin, polyamide resin, polystyrene resin, polypropylene resin, urethane resin, chlorotrifluoroethylene resin, tetrafluoroethylene resin, tetrafluoroethylene-hexafluoropropylene copolymer resin, tetrafluoroethylene-perfluoroalkyl vinyl ether copolymer resin, vinylidene fluoride resin, ethylene-tetrafluoroethylene copolymer resin, polyacetal resin, polyethylene terephthalate resin, polybutylene terephthalate resin, polyphenylene ether resin, polycarbonate resin, aliphatic polyketone resin, polyphenylene sulfide resin, polyether sulfone resin, polyether imide resin, polyamide imide resin, polyether ether ketone resin, and thermoplastic polyimide resin.

It is also possible to exemplify mixtures each consisting of not less than two kinds of the above-described synthetic resins, namely, polymer alloys. Of these resin materials, the resin material that provides the lowest friction is the polyethylene resin. In terms of wear resistance, it can be said that the polyethylene resin containing an ultra-high-molecular-weight component is the most favorable synthetic resin.

As the above-described solid lubricant and lubricating oil, a solid lubricant, generally used, such as polytetrafluoroethylene, graphite, molybdenum disulfide, boron nitride, tungsten disulfide, and the like; a mineral oil such as spindle oil, oil for refrigerator, turbine oil, machine oil, dynamo oil, and the like; and a synthetic oil such as hydrocarbon, ester, polyglycol, silicone oil, fluorinated oil, and the like are listed. That is, oils generally used are listed. It is possible to impregnate the bearing peripheral part made of the sintered metal with these oils and bleed them to the sliding surface through the resin layer to thereby lubricate the sliding surface. The oil impregnation can be accomplished by a vacuum impregnation method or the like.

To improve the frictional and abrasive properties of the resin material and decrease the coefficient of linear thermal expansion thereof, appropriate filler materials can be added thereto. For example, fibers such as glass fiber, carbon fiber, pitch-based carbon fiber, polyacrylonitrile-based carbon fiber, aramid fiber, alumina fiber, polyester fiber, boron fiber, silicon carbide fiber, boron nitride fiber, silicon nitride fiber, metal fiber, and quartz wool; cloth formed by knitting these fibers; minerals such as calcium carbonate, talc, silica, clay, and mica, and the like; inorganic whiskers aluminum borate whisker, potassium titanate, and the like; and heat-resistant resins such as polyimide resin, polybenzimidazole, and the like. Further, to improve the thermal conductivity of a lubricating composition, it may contain carbon fiber, metal fiber, graphite powder, zinc oxide, and the like. Furthermore the lubricating composition may contain carbonates such as lithium carbonate, calcium carbonate, and the like; and phosphates such as lithium phosphate, calcium phosphate, and the like.

Additives widely applicable to synthetic resins generally used may be used in combination with the above-described filler material, provided that the addition amount thereof does not inhibit the effect of the present invention. For example, additives for industrial use such as a mold release agent, a fire-retardant agent, an antistatic agent, a weather resistance modifying agent, an antioxidant, and a coloring agent may be appropriately added to the synthetic resins. The method of adding these additives thereto is not limited to a specific method.

So long as the lubricating property of the resin composition of the present invention is not inhibited, it is possible to modify an intermediate product or an end product of the resin composition to improve the property thereof by chemical processing such as annealing or physical processing.

As the resin composition that can be used in the present invention, it is possible to exemplify a resin composition containing the above-described resin material and a filler material, having an interconnected hole formed therein, which is added to the resin material.

As the filler material having the interconnected hole, porous powder such as porous silica and the like are listed. A preferable porous silica is powder containing amorphous silicon dioxide as its main component. It is possible to list precipitated silica which is an aggregate of primary fine particles having a diameter not less than 15 nm; and perfectly spherical porous silica, disclosed in Japanese Patent Application Laid-Open No. 2000-143228 and the like, which is an aggregate of primary fine particles having a diameter of 3 to 8 nm. The perfectly spherical porous silica is prepared by emulsifying a solution of alkali silicate containing an alkali metal salt or an alkali earth metal salt in an organic solvent and setting the gelated substance with carbon dioxide.

The porous silica consisting of the perfectly spherical silica particle which is the aggregate of the perfectly spherical primary fine particles having the diameter of 3 to 8 nm has the interconnected hole. Thus in the present invention, the porous silica is especially preferable. It is preferable that the average diameter of the perfectly spherical silica particles is 0.5 to 100 µm. It is especially preferable that the average diameter thereof is 1 to 20 µm when handleability of the resin composition and imparting of sliding performance thereto are considered.

As the perfectly spherical porous silica, "SUNSPHERE" produced by ASAHI GLASS CO., LTD. and "God ball" produced by SUZUKI YUSHI INDUSTRIAL CO., LTD. are listed. As porous bulk-shaped silica, "MICLOID" produced by TOKAI CHEMICAL INDUSTRY CO., LTD. and the like are exemplified.

It is preferable that the perfectly spherical silica particle consisting of the aggregate of the primary particles having the diameter of 3 to 8 nm has properties that the specific surface area thereof is 200 to 900 m$^2$/g and preferably 300 to 800 m$^2$/g, that the volume of a pore is 1 to 3.5 ml/g, that the diameter of the pore is 5 to 30 nm and preferably 20 to 30 nm, and that the oil absorption amount thereof is 150 to 400 ml/100 g and preferably 300 to 400 ml/100 g. It is preferable that even though the perfectly spherical silica particle is dried again after it is immersed in water, the volume of the pore and the oil absorption amount are kept at not less than 90% of those before it is immersed. The specific surface area and the volume of the pore are measured by a nitrogen adsorption method, and the oil absorption amount is measured in accordance with JIS K5101.

It is preferable that the inside of the perfectly spherical silica particle and its outer surface are covered with silanol (Si—OH) because the lubricant can be easily held inside it.

The porous silica can be surface-treated with organic or inorganic agents suitable for the parent body. The configuration of the particle of the porous silica is not limited to a specific one, but unspherical porous silica can be used, provided that the average diameter of the particle, the specific surface area thereof, and oil absorption amount thereof fall within the range of those of the perfectly spherical silica particle. In view of the property of attacking the mating member which slides on the bearing and the kneadability, spherical and perfectly spherical particles are more favorable. The "spherical" means a ball having 0.8 to 1.0 as the ratio of the minor diameter to the major diameter. The "perfectly spherical" means a ball whose configuration is closer to a perfect sphere than the spherical ball.

In the resin layer, the product of a coefficient of linear thermal expansion (unit: 1/° C.) of said resin material and a thickness (unit: µm) of said resin layer ((the coefficient of the linear thermal expansion of the resin material (unit: 1/° C.))× (the thickness of the resin layer (unit: µm))) is favorably not more than 0.15, more favorably not more than 0.13, and most favorably not more than 0.10. When the above-described value is more than 0.15, the thickness or expansion of the resin part becomes large. At this time, because the outer-diameter side of the resin part is bounded with the metal, the resin part is incapable of expanding more than the metal, expands radially inward, and the inner diameter thereof becomes small. As a result, the gap between the resin part and the shaft decreases. Thus in dependence on the dimension of a gap initially set, there is a possibility that wrap of the resin part around the shaft occurs owing to a rise of temperature. An excessive fluctuation of the gap is not preferable because the excessive fluctuation thereof causes a torque to fluctuate. It is preferable that the gap is small in terms of the rotational accuracy of the high-accuracy sliding bearing. Further owing to water absorption, a dimensional change becomes large and thus the dimension of the gap may fluctuate excessively.

The thickness of the resin layer that can be molded is about 50 µm. If the thickness of the resin layer is smaller than 50 µm, it is difficult to mold the resin composition. Therefore (the coefficient of expansion of resin)×(the thickness of the resin layer) is required to be not less than 0.003, favorably not less than 0.01, and more favorably not less than 0.015.

A proximal configuration of the high-accuracy sliding bearing of the present invention can be selected in conformity with the configuration of the sliding portion of a radial type, a flange-provided bush, and the like.

Figure 4:
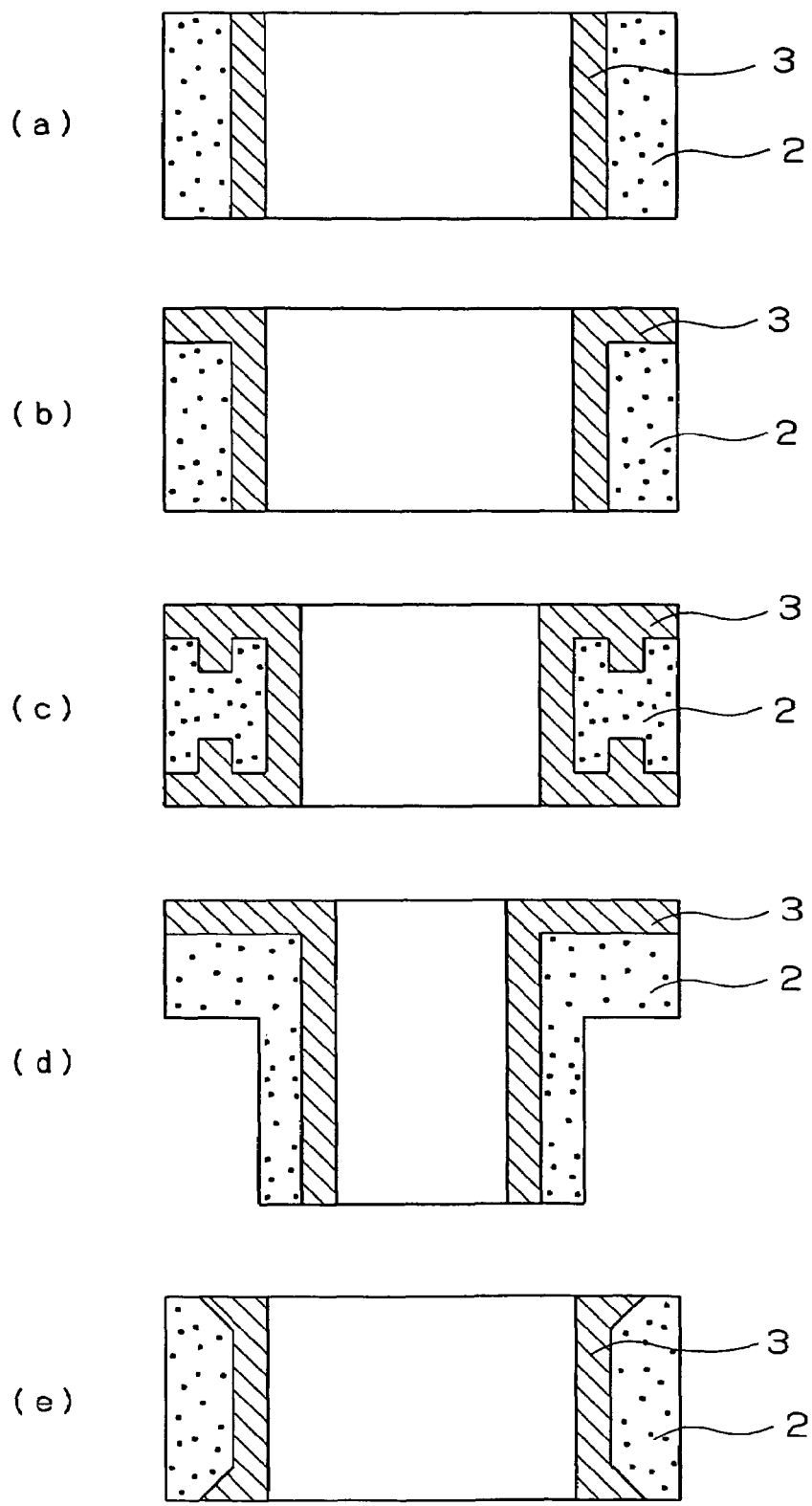
FIG. 4 is a sectional view showing a sliding surface of a bearing peripheral part.

The place of the bearing peripheral part where the resin layer is molded is not specifically limited, provided that the resin layer is molded on the sliding portion of the bearing peripheral part. Cases as shown in FIGS. 4(a) through 4(e) are exemplified. In FIGS. 4(a) and 4(e), to support a load in the radial direction, the resin layer 3 is formed on the inner-diameter-side radial sliding surface of the bearing peripheral part 2. In FIGS. 4(b), 4(c), and 4(d), to support a load in the radial and thrust directions, the resin layer 3 is formed on the inner-diameter-side radial sliding surface of the bearing peripheral part 2 and the thrust sliding surface thereof. Although not shown, as necessary, it is possible to provide the outer-diameter part of the bearing with the resin layer. As shown in FIGS. 4(c) and 4(e), it is possible to adopt a configuration of the resin layer having a fastening portion for preventing the bearing peripheral part and the resin layer from separating from each other.

Although a plurality of the grooves formed on the sliding portion is not shown in FIGS. 4(a) through 4(e), it is preferable to form a plurality of grooves on the radial sliding surface of the cylindrical bearing, the thrust sliding surface thereof or both the radial sliding surface and the thrust sliding surface.

The high-accuracy sliding bearing of the present invention has characteristics that it has a high accuracy and an excellent sliding performance and does not attack a soft mating material such as an aluminum shaft. Therefore the high-accuracy sliding bearing can be used at a position where a high rotational accuracy is required for a supporting bearing for a photosensitive drum, a developing part, and/or a fixing part, and the like of office appliances such as a copying machine, a printer, and the like. By using the high-accuracy sliding bearing therefor, it is possible to suppress the generation of an abnormal noise.

The high-accuracy sliding bearing can be also used as a carriage bearing. A sintered metal is used as the carriage material of the carriage bearing. The carriage material made of the sintered metal is excellent in its sliding performance, but the metal of the mating shaft and that of the bearing slide on each other. Therefore when a lubricating state deteriorates, an abnormal noise may be generated. When the carriage bearing made of resin is used, the abnormal noise is not generated. But it is difficult for the carriage bearing to keep an accurate performance. On the other hand, when the high-accuracy sliding bearing of the present invention is used as the carriage bearing, the high-accuracy sliding bearing keeps a high accuracy and slides on the shaft at the resin layer thereof. Thus it is possible to suppress the generation of the abnormal noise.

Further to suppress the generation of the abnormal noise, it is possible to replace a sliding bearing used at a comparatively low load and at a low speed with the high-accuracy sliding bearing of the present invention.

EXAMPLE

A bearing peripheral part consisting of a sintered metal (coefficient of linear thermal expansion: $1.1 \times 10^{-5}/°$ C.) containing not less than 90% of Fe having a dimension of $\phi 8.5$ mm$\times \phi 14$ mm$\times t$ 5 mm was prepared. The bearing peripheral part was inserted into a die for injection molding use. A resin material shown below was molded on the inner-diameter surface of the bearing peripheral part through tunnel gates by carrying out a method described below. A composite sliding bearing having a dimension of $\phi 8$ mm$\times \phi 14$ mm$\times t$ 5 mm was prepared. The composite sliding bearing had three axial grooves each having a gate mark formed thereon and three axial grooves not having the gate mark formed thereon, with the six grooves disposed at regular intervals and with the three axial grooves each having the gate mark formed thereon alternating with the three axial grooves not having the gate mark formed thereon (configuration: FIG. 1(a), thickness of resin layer: 250 μm). A test was conducted on the produced high-accuracy sliding bearing in the following conditions.

(1) Resin Material
Base resin: polyethylene ("LUBMER L5000" produced by Mitsui Chemicals, Inc.)
Filler: silicone oil (KF96H-6000 produced by Shin-Etsu Silicones Inc.)
Porous silica (SUNSPHERE H33 produced by ASAHI GLASS CO., LTD.)

A mixture of porous silica and silicone oil mixed at a mixing ratio of 1:2.76 (conversion to weight) was prepared. 31.6 wt % of the mixture and 68.4 wt % of polyethylene resin were melted and kneaded by using a biaxial extrusion apparatus to form a pellet. The coefficient of linear thermal expansion of the resin composition was 0.00013/° C. Because the thickness of the resin layer was 250 μm, (the coefficient of linear thermal expansion of the resin material)×(the thickness of the resin layer) was 0.0325.

(2) Molding Condition
Molding was carried out through tunnel gates by fixing the sintered metal having a predetermined configuration to the die and using the oil-containing pellet.
Temperature of die: 100° C.
Molding temperature: 210° C.
Injection pressure: 140 MPa (3) Test Condition
Wear and Friction Test
Mating shaft: A5056 (aluminum alloy, Ra=0.8 μm), $\phi$7.985 mm
Face pressure: 1 MPa (converted to projected area)
Peripheral speed: 3 m/minute
Temperature: 30° C.
Period of time: 120 hours The kinetic coefficient of friction and the wear amount after the test finished was 0.08 and not more than 10 μm respectively. Wear of the shaft was not observed. The gap between the shaft and the sliding bearing was 15 μm (measured at 20° C.)

Measurement of Change in Dimension at Inner-Diameter Side

To examine the influence of heat on expansion, the outer-diameter side of the sliding bearing was bounded with the sintered metal to allow the dimension of only the inner-diameter side to change from −10° C. to 60° C. so that to what extent the dimension of the inner-diameter side changed was measured (the dimensional change amount with respect to the dimension at 20° C. was found). The dimensional change amount of the inner diameter of the specimen and the dimensional change amount of the shaft were measured at each temperature. As a result, the gap between the specimen and the shaft was less than 25 μm.

Measurement of Gap

The gap between the resin layer and the shaft of A5056 inserted thereinto was measured at −10° C. and 60° C. As a result, the gap was 17.2 μm and 11.7 μm respectively. An initial gap was set to 15 μm. The dimensional change amount was −5.2 μm (−10° C.) and 7 μm (60° C.) (the coefficient of linear thermal expansion of the material of the shaft: $2.2 \times 10^{-5}/°$ C.)

INDUSTRIAL APPLICABILITY

The high-accuracy sliding bearing of the present invention has the resin layer by molding the resin material through the tunnel gates. Thus it is unnecessary to treat the gate mark in a molding step. Therefore the high-accuracy sliding bearing can be mass-produced. Therefore the high-accuracy sliding bearing can be used instead of sliding bearings of office appliances and general-purpose apparatuses.

The invention claimed is:
1. A high-accuracy sliding bearing comprising
a bearing peripheral part having a sintered metal,
a resin layer which is formed by molding of a resin material to a sliding portion of said bearing peripheral part, and a product of a coefficient of linear thermal expansion (unit: 1/° C.) of said resin material and a thickness (unit:μm) of said resin layer is not more than 0.15,
wherein said resin layer is formed by molding through tunnel gates,
wherein said resin layer has a plurality of grooves on a bearing sliding surface thereof and has gate marks of said tunnel gates on bottoms of said grooves,
wherein said grooves includes grooves identified as grooves A where each of said grooves A has said gate mark and also includes grooves identified as grooves B which do not have said gate mark; said grooves being disposed so that a distance between each of said grooves B and one side of the adjacent groove A on said bearing sliding surface and the distance between each of said grooves B and other side of said adjacent groove A are equal to each other,
wherein a weld portion is formed in each of said grooves B.

2. The high-accuracy sliding bearing according to claim 1, wherein said grooves formed on a radial sliding surface of a cylindrical bearing or a thrust sliding surface thereof.

3. The high-accuracy sliding bearing according to claim 1, wherein said resin material is composed of polyethylene resin and porous silica added thereto.

4. The high-accuracy sliding bearing according to claim 1, wherein at least one of said resin layer and said sintered metal is impregnated with a lubricating oil.

5. The high-accuracy sliding bearing according to claim 1, wherein said grooves A and B are arranged at equal intervals and the number of said grooves A equals the number of the grooves B.

* * * * *